United States Patent [19]

Roetling

[11] 4,051,536
[45] Sept. 27, 1977

[54] ELECTRONIC HALFTONE IMAGING SYSTEM

[75] Inventor: Paul G. Roetling, Ontario, N.Y.

[73] Assignee: Xerox Corporation, Stamford, Conn.

[21] Appl. No.: 558,594

[22] Filed: Mar. 14, 1975

[51] Int. Cl.$^2$ .............................................. H04N 1/22
[52] U.S. Cl. .................................. 358/298; 358/283; 358/300; 358/302
[58] Field of Search ............. 178/6.6 A, 6.6 R, 6.6 B, 178/6.7 R, 6, 5; 358/283, 298, 300, 302, 296

[56] References Cited

U.S. PATENT DOCUMENTS

| | | | |
|---|---|---|---|
| 2,892,887 | 6/1959 | Hell | 178/6.6 B |
| 2,962,548 | 11/1960 | Taudt | 178/6.6 B |
| 3,294,896 | 12/1966 | Young | 178/5 |
| 3,604,846 | 9/1971 | Behane | 178/6.6 R |
| 3,681,650 | 8/1972 | Koll | 178/6.7 R |

*Primary Examiner*—Raymond F. Cardillo, Jr.
*Attorney, Agent, or Firm*—James J. Ralabate; Gaetano D. Maccarone; John H. Faro

[57] ABSTRACT

An electronic halftoning image reproduction system wherein a halftone screen function is combined with pictorial information, typically by addition, to provide a sum function. In a second channel the pictorial signal is averaged over the area corresponding to one period of the halftone screen function and the average is utilized to determine the percent of the area to be turned white within that halftone dot. This is accomplished by thresholding the sum function with a dynamically adjusted threshold for each period of the halftone dot such that the percentage of white matches the average pictorial signal. In another embodiment wherein the desired gray scale of the reproduction is different from that of the original image, the average pictorial signal may be adjusted in some predetermined manner and the percentage of white is matched to the adjusted signal. In a digital implementation the result is obtained by starting at the sample location with the largest value of the sum function and setting subdots white until the correct area is white. All steps are repeated over each period of the halftone.

12 Claims, 5 Drawing Figures

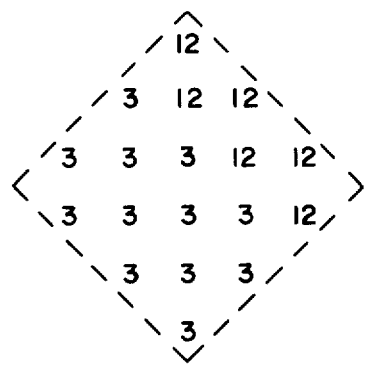
FIG. IA
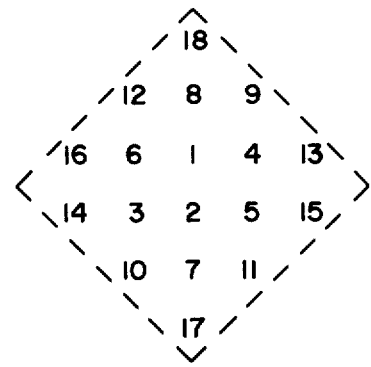
FIG. IB
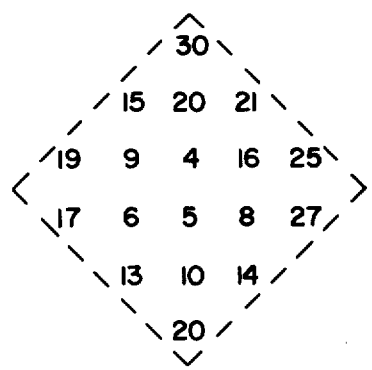
FIG.IC
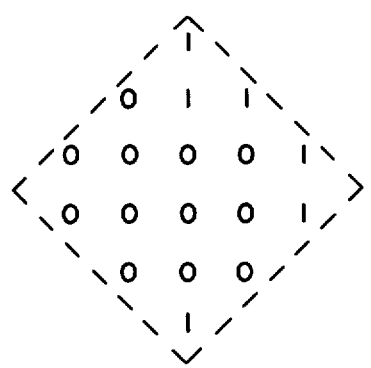
FIG.ID

ELECTRONIC HALFTONE IMAGING SYSTEM

BACKGROUND OF THE INVENTION

This invention relates generally to an electronic halftoning system for reproducing images and more specifically to such a system wherein detail contrast and large area contrast are controlled independently of each other.

Halftoning, also frequently referred to as "screening", generally comprises reproduction of an image in which the gray scale values of a continuous tone image are to be represented using only varying areas of either black or white. Various techniques for electronic halftoning have been disclosed. In electronic halftoning a signal representing the image information is combined with the halftone screen and thresholded electronically so that the output electronic signal is binary. This tends to reduce the reliance of the system on controlled thresholding of the image recording process; however, the threshold level still has some effect.

According to a preferred prior art electronic halftoning technique, a simulation of the photographic process is provided by electronic means. Each electronic halftone dot is generated from a large number of subcells, each of which is individually turned on or off. In order to provide a high quality halftone a separate sample (also referred to as a "pixel") of the image to be reproduced is utilized in making a decision as to whether to turn on or off each subdot element. In this method there is combined (typically by addition) a halftone function (i.e., a periodic function unrelated to image detail) with the electronic signal corresponding to the image information. This combined signal is then compared with a fixed threshold to determine whether to turn the spot on or off. Typically, levels above threshold are made white in the reproduction and levels below threshold are made black, although this is arbitrary and the reverse may be true. Hence, the continuous tone original image becomes a binary image suitable for printing. In a digital implementation, signals for the screen and picture functions are sampled. Typically, there may be sixteen or more samples within the area corresponding to one period of the two dimensional screen function. Dots of various size represent the gray levels. Dots can also change shape or position as well as size and thus tend to represent image detail finer than the halftone screen period. This method has been described, for example, by Klensch, R. J., "Electronically Generated Halftone Pictures", *RCA Review*, September, 1970 and Bayer, B. E., "An Optimum Methof for Two-Level Rendition of Continuous-Tone Pictures", *IEEE International Conference on Communications*, Vol. 1, 1973.

The prior art electronic halftoning techniques have not been found to be entirely satisfactory. For example, if the screening process is adjusted to give good tone reproduction over the full range of grays, the systems typically become poor for reproducing text unless the text is of very high contrast. Also, if the original image includes very fine detail the systems typically produce errors in gray scale, tending to fail to reproduce the gray scale properly and the closer the detail of the image resembles the screen, such as where the original image is itself a halftone image, the more severe the failure becomes, typically resulting in the occurrence of undesirable Moire patterns in the unscreened image. Another deficiency of prior art electronic halftoning methods is that no possibility exists for introducing simultaneous sharpening of the image.

SUMMARY OF THE INVENTION

It is an object of this invention to overcome the above-noted deficiencies and provide the above-noted desirable features.

It is another object of the invention to provide a novel electronic halftoning system.

It is a further object of the invention to provide an electronic halftoning system wherein detail contrast and large area contrast are controlled independently of each other.

Still further it is an object to provide an electronic halftoning system wherein simultaneous sharpening of the original image is possible.

Another object is to provide an electronic halftoning system whereby it is possible to reproduce detail which is fine compared to the frequency of the screen and also having the capability to reproduce the range of gray scales in the presence of detail.

Still another object is to suppress the occurrence of Moire patterns in reproduction of original images which are themselves halftone images.

BRIEF SUMMARY OF THE INVENTION

These and other objects and advantages are accomplished according to the invention by providing an electronic halftoning reproduction system wherein a halftone screen function is combined with pictorial information, typically by addition, to provide a sum function. In a second channel the pictorial signal is averaged over the area corresponding to one period of the halftone screen function and the average is utilized to determine the percent of the area to be turned white within the halftone dot. This is accomplished by thresholding the sum function with a dynamically adjusted threshold for each period of the halftone such that the percentage of white matches the average pictorial signal. In another embodiment wherein the desired gray scale of the reproduction is different from that of the original image, the average pictorial signal may be adjusted in some predetermined manner and the percentage of white is matched to the adjusted signal. In a digital implementation, this result is accomplished by starting at the sample location with largest value of the sum function and setting subdots white until the correct area is white. All steps are repeated over each period of the halftone. Thus. according to the system the thresholding step for each halftone dot is performed by a comparison to a variable, rather than a fixed, threshold level. The threshold level used for each halftone dot is constant for all subcells within the halftone dot but varies from halftone dot to halftone dot. The value of the threshold is adjusted by feedback so that the total transmittance or reflectance over the dot area in one period matches a separate measurement of the total transmittance or reflectance of the original input image over one halftone period.

BRIEF DESCRIPTION OF THE DRAWINGS

For a better understanding of the invention as well as other objects and further features thereof, reference is made to the following detailed description of various preferred embodiments thereof, taken in conjunction with the accompanying drawings wherein:

FIG. 1A is a digital representation of typical gray scale values present in one halftone period of an original image;

FIG. 1B is a digital representation of a halftone dot period of a halftone screen;

FIG. 1C is a digital representation of the sum function of the digitally represented image information of FIG. 1A and the digitally represented halftone screen of FIG. 1B.

FIG. 1D is a digital representation of the halftone image reproduction over one halftone period of the original image illustrated in FIG. 1A.

DESCRIPTION OF THE PREFERRED EMBODIMENTS

Figure 2:
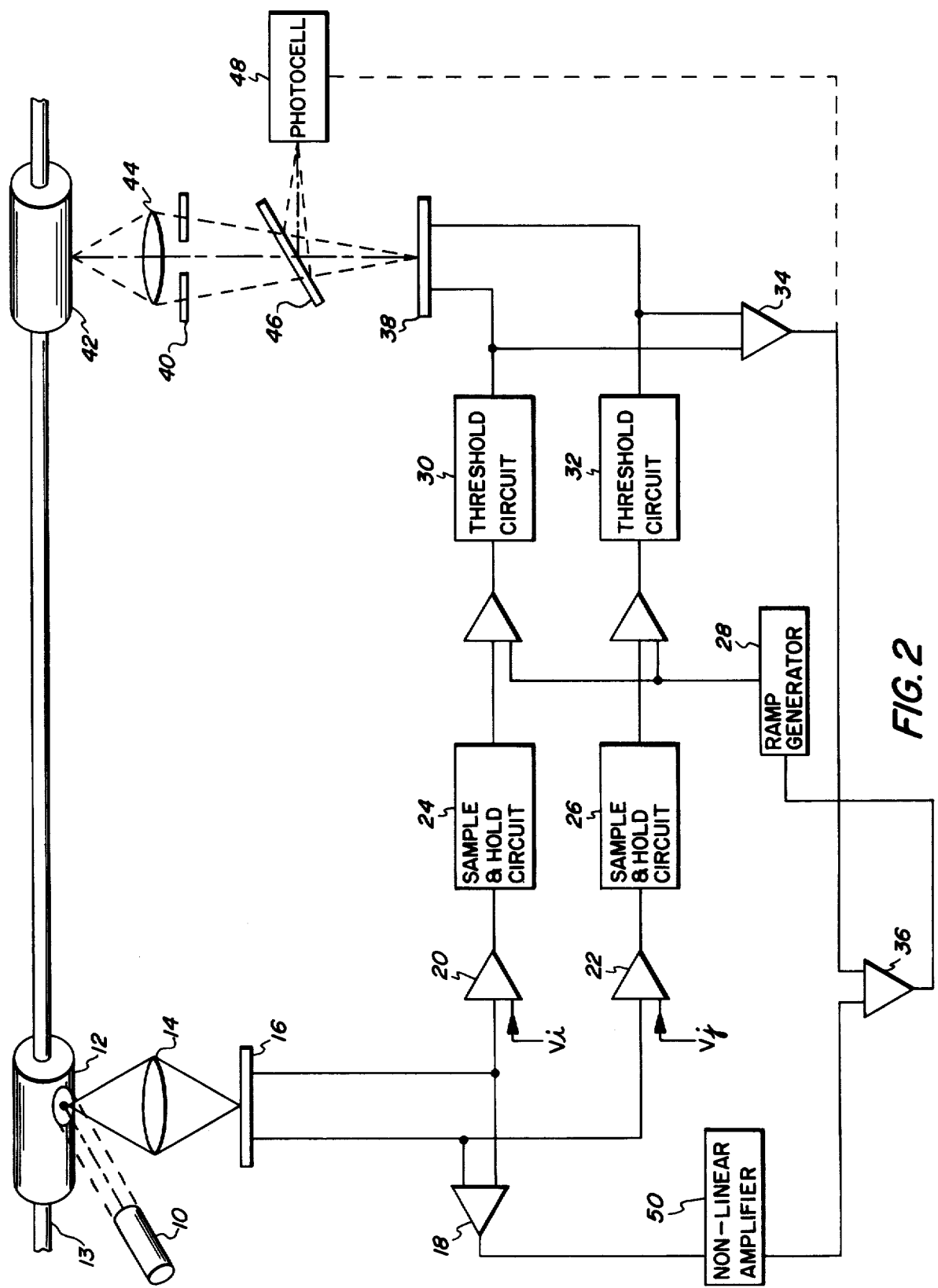
FIG. 2 is a schematic block diagram of an embodiment of an electronic halftone image reproduction system according to the invention.

Referring now to FIG. 1A there is seen a digital representation of the gray scale range of information present in a halftone dot area covering one period of the two dimensional screen function. It should be noted that the halftone dot period may be broken down into any number of discrete elements, for example, 5 × 5 or more discrete elements are typically defined in each halftone dot period. However, for purposes of illustration, the halftone dot period shown throughout FIG. 1 is broken down into eighteen subdots. The numeral 3 in FIG. 1A represents the darker areas of the original image and the numeral 12 represents the lighter areas of the image. Of course, this scheme is completely arbitrary. FIG. 1B is a digitized representation of a halftone dot period of a halftone screen which may be used to screen the original image. The low numbers again represent darker areas and the high numbers the lighter areas. The numbering scheme chosen is arbitrary; however, it should include as many numbers as there are elements present in the halftone dot period. FIG. 1C is a digital representation of the sum function obtained by adding the pictorial information of FIG. 1A and the halftone screen function of FIG. 1B.

According to the invention the sum of the digitized pictorial information is computed and divided by the number of subcells in the halftone dot period to obtain the average reflectance of that area. In the present illustration the sum of the digitized pictorial information is 108 in this period and this sum is divided by 18, the number of discrete elements in the halftone dot period to show that six bits should be turned white so that the reproduced halftone dot will correctly match the total reflectance or transmittance of the original input image over that halftone dot period. Accordingly, the sum function is thresholded at an appropriate level (19.5 in this example) to provide this result, giving the black/white pattern illustrated in FIG. 1D. This is done by starting at the sample location with the largest value of the sum function and setting subdots white until the correct area is white. The process is repeated for each halftone period over the entire original image.

An important advantage of the present system is that large area contrast is controlled independently of detail contrast. Large area contrast and gray scale is controlled by the threshold selection, as described, to reproduce the gray levels of the original image. It is also noted that if other than exact reproduction of grays is desired, the threshold level may be changed until the desired large area grays are obtained over each halftone dot. Detail contrast is dependent on the relative contrast of the pictorial and halftone screen representations. Detail has more effect on dot shape and thus increases detail contrast if the range of values selected for the halftone screen is made smaller compared to the range of pictorial values. Thus, the system has the capability to reproduce detail which is fine compared to the halftone screen period and also has the capability of properly reproducing the gray scale in the presence of the fine detail. Another important feature of the present system is that it suppresses the occurrence of undesirable Moire patterns in the reproduction where the input image contains fine detail which resembles the halftone screen such as where the input image is itself a halftone image. Moreover, because the system allows independent control over large area contrast and detail contrast it is possible to edge enhance the input image which can provide a sharper reproduced image including improved text where it is present.

Although the halftone image reproduction method of the invention has been described with respect to an embodiment wherein the halftone screen is at an angle of 45° to the original image, it should be noted that the screen may be at any angle. The 45° angle screen was chosen for purposes of illustration since it is the type normally used in graphic arts. Moreover, in the embodiment described, one picture element, or "pixel", is used to control one subcell of the halftone dot. However, one pixel may be used to control more than one subcell. For example, if the image is scanned at 600 lines/inch and if 36 subcells per halftone dot are desired, the halftone screen would be approximately 100 lines/inch. A 200 lines/inch halftone screen frequency could be obtained by scanning at 1200 lines/inch or by using each of the 600 lines/inch scans for generating two lines of subcells. As noted previously, the halftone screen function is typically, and preferably, combined with pictorial information by addition to provide a sum function. The sum function may also be obtained by multiplication.

It should be noted that although the invention has been described with respect to an embodiment wherein there is provided a signal which is the mean average over the halftone dot area, the invention may also be practiced by obtaining the signal in other ways. For example, the signal can be obtained by low pass filtering the continuous tone image or by taking various weighted averages over th area of one or several halftone dots. In some instances these techniques may improve resultant image quality. Such image filtering techniques are known in the art. For the purposes of this application the term "providing an electronic signal representing the average gray scale of an original image" is generally intended to include any suitable technique for doing so and specifically all of the techniques mentioned above.

Referring now to FIG. 2 wherein there is illustrated a schematic block diagram of an electronic halftone image reproduction system according to the invention, a scanner 10 sequentially illuminates an original image which is attached to the periphery of drum 12 which rotates about shaft 13. Of course, the original image may be a transparency as well as an opaque document. Scanner 10 operates at speeds of a millisecond or less per halftone period covered, though the actual speeds will depend upon the characteristics of the particular optical and electronic components used in any embodiment of the invention. Each halftone dot period of the original image illuminated by scanner 10 is sequentially imaged by imaging lens 14 onto a light sensitive element 16 such as, for example, a photodiode array. The light sensitive element includes a plurality of light sensitive detectors, one for each discrete element in the halftone period area. Typically, the halftone period area is broken doen into at least 5 × 5 discrete elements. The various intensities of light striking the light sensitive element 16 are dependent upon the densities of the tone in the original image. The light is transduced by photodiode array 16 into analog electronic signals. The analog electronic signal from each light sensitive detector in photodiode array 16 is fed into summing circuit 18, where they are added to give a signal representative of the total amount of light reflected by the halftone dot period. Alternatively, a beam splitter could be interposed between imaging lens 14 and photodiode array 16 and a portion of the light in the beam directed to a separate photodiode having only a single light sensitive detector. In this case the light would be transduced into a single electronis signal representative of the total amount of light reflected by the halftone dot period and the electronic signal would replace the output of circuit 18. Although the embodiment shown in FIG. 2 is illustrated with a moving scanner 10 and rotating drum 12 and lens 14 and photodiode array 16 moving with scanner 10, any suitable arrangement of these elements may be employed. For example, the scanner may be stationary and the shaft 13 on which the drum is mounted may be a lead screw so that the drum moves transversely as it is rotated.

The electronic signal from each light sensitive detector in photodiode array 16 is then fed into a separate summing circuit at which point there is added to the signal a reference voltage representative of the halftone screen function. For ease of illustration the signals from two of the light sensitive detectors in photodiode array 16 are shown; however, it is understood that the electronic signal from each detector is treated in a similar fashion. A different reference voltage, illustrated by $v_i$ and $v_j$ is added to the output signal from the respective detectors in photodiode array 16 by summing circuits 20 nd 22, respectively. It is again noted that the values of the respective reference voltages can be varied to control detail contrast, as has been previously described.

The signals from the summing circuits are then brought into sample and hold circuits 24 and 26, respectively. These sample and hold circuits are not required if the original image is scanned slowly enough; however, they are preferred since they allow the image to be scanned electronically, that is, at speeds of a millisecond or less per halftone period covered. Each electronic signal at this point represents the sum function of the subcell pictorial information and the halftone screen function. The sum function for each subcell is next added to a dynamically adjusted, amplitude varying voltage signal common to all subcells supplied by a single ramp generator 28. Each electronic signal is then directed through fixed level threshold circuits 30 and 32, respectively, to a light omitting diode array 38 which includes as many light emitting diodes as the number of light sensitive detectors in photodiode 16. The light emitting diodes are arranged in a pattern similar to that of the light sensitive detectors in photodiode array 16 which control them.

Not shown, but comprised of well known elements, is a timing mechanism which starts a sequence by triggering the sample and hold circuits 24, 26 to sample the signals from summing circuits 20 and 22, respectively. The timing mechanism starts the ramp generator 28 voltage increasing, thus effectively producing the dynamically varying threshold. The outputs of the threshold circuits 30 and 32 are fed into circuit 34 where they are summed. The signal representing the sum is directed into circuit 36 which compares the electronic signal from circuit 34 with the electronic signal from circuit 18. When the two voltage signals match, circuit 36 emits a pulse which stops any further increase of the voltage signal from ramp generator 28. In operation the electronic signals representing the sum functions having the largest values will cause the appropriate light emitting diodes in array 38 to become operative until the total light output matches the total amount of light reflected by the original image in the area of the halftone period being examined. The remaining light emitting diodes will not be energized. A short time after these actions the timing mechanism opens shutter 40 momentarily allowing the energized light emitting diodes to expose a photoreceptor 42 through lens 44. The photoreceptor 42 may be any suitable light sensitive recording medium such as a photographic film or a charged xerographic member. In a preferred embodiment, as illustrated, the photoreceptor comprises a charged xerographic drum which rotates about shaft 13 and is matched to the movement of drum 12 which carries the original image. Alternatively, photoreceptor 42 could be moved by another scanner, similar to 10 and matched to it. After the photoreceptor is exposed the timer resets the circuits in the system and starts the next cycle. This sequence is repeated for ech halftone period of the original image.

It should be noted that alternative elements may be used in the embodiment shown in FIG. 2. For example, circuit 34 can be removed and a beam splitter 46 and photocell 48 added. In this embodiment the beam splitter 46 is positioned to direct a portion of the total light output from light emitting diode array 38 to photocell 48. Photocell 48 transduces the light from light emitting diode array 38 into an analog electronic signal which is directed into circuit 36 for comparison with the electronic signal from circuit 18. As previously described, when these signals match, circuit 36 emits a pulse which stops any further increase of the voltage signal from the ramp generator 28.

In another embodiment of the invention it is possible to provide a reproduction having a different gray scale than that of the original image. This may be done by adjusting the electronic signal from circuit 18 with nonlinear amplifier 50 in some predetermined manner, thus in effect changing the average reflectance from the halftone period of the original being examined. Accordingly, the gray scale of the reproduction can be varied from that of the original image while continuing to reproduce the detail contrast of the original thus providing the ability to obtain edge enhanced reproduced images.

Although this method of the invention has been described with respect to specific preferred embodiments thereof it is not intended to be limited thereto but rather those skilled in the art will recognize that variations and modifications may be made therein which are within the spirit of the invention and the scope of the claims. For example, a computer could be used in place of the electronic elements shown in FIG. 2 and provide the same functions.

I claim:

1. A method for creating on a light sensitive recording medium a halftone reproduction of an original image comprising the steps of:
   a. providing an electronic signal representing the average gray scale of said original image over a halftone dot period;
   b. providing a plurality of electronic signals representing details of said original image over said halftone dot period;
   c. providing a halftone screen function in electronic form;
   d. combining said halftone screen signals of (c) with said original image signals of (b) to provide a plurality of sum functions; and
   e. dynamically adjusting the threshold for each of said sum functions so as to match the average gray scale of the original image over a halftone dot period with the sum function for the corresponding halftone dot period.

2. The method as defined in claim 1 wherein said original image signals of (b) and said halftone screen function of (c) are combined by addition.

3. The method as defined in claim 1 wherein said original image signals of (b) and said halftone screen function of (c) are combined by multiplication.

4. The method as defined in claim 1 wherein one picture element of said original image is used to control one subcell of the halftone dot period.

5. The method as defined in claim 1 wherein one picture element of the original image is used to control more than one subcell of the halftone dot period.

6. The method as defined in claim 1 wherein said light sensitive recording medium comprises a xerographic member.

7. The method as defined in claim 1 wherein steps (a) and (b) are carried out with means including a scanner.

8. A method as defined in claim 1 wherein Step (a) comprises providing an electronic signal representative of an average gray scale which differs from the average gray scale of the original, and controlling the threshold of the sum function of Step (e) with the electronic signal of Step (a).

9. Apparatus for providing a halftone reproduction of an original image on an imaging member in combination means for providing an electronic signal representing the average gray scale of an original image over a halftone dot period and for providing a plurality of electronic signals representing details of said original image over said halftone dot period;

means for providing a halftone screen function in electronic form;

means for combining said halftone screen signals and said plurality of electronic signals representing details of said original image to provide a plurality of sum functions;

means for thresholding said sum functions;

means for dynamically adjusting the threshold for each of said sum functions so as to match the average gray scale of the original image over a halftone dot period with the sum function for the corresponding halftone dot period;

an imaging member; and means for communicating the electronic information corresponding to the halftone reproduction to the imaging member.

10. The apparatus as defined in claim 9 wherein said electronic signal providing means includes a scanner.

11. The apparatus as defined in claim 9 wherein said imaging member comprises a xerographic reproduction device.

12. The apparatus as defined in claim 9 wherein said electronic signal providing means includes means to adjust said signal representing the average gray scale of the original image over a halftone dot period in some predetermined manner.

* * * * *